United States Patent [19]

Miranda et al.

[11] Patent Number: 5,770,287
[45] Date of Patent: Jun. 23, 1998

[54] VACUUM SKIN PACKAGE AND COMPOSITE FILM THEREFOR

[75] Inventors: Nathanael R. Miranda, Gastonia, N.C.; Robin H. Logan, Spartanburg; Gregory M. Wilson, Greer, both of S.C.

[73] Assignee: W. R. Grace & Co.-Conn., Duncan, S.C.

[21] Appl. No.: 715,112

[22] Filed: Sep. 17, 1996

Related U.S. Application Data

[63] Continuation of Ser. No. 369,846, Jan. 6, 1995, abandoned, which is a continuation-in-part of Ser. No. 343,299, Nov. 22, 1994, abandoned.

[51] Int. Cl.$^6$ .................................................. B65D 81/20
[52] U.S. Cl. .................. 428/40.1; 206/461; 206/469; 206/479; 206/484; 206/484.2; 426/127; 428/40.5; 428/41.3; 428/41.5; 428/41.7; 428/41.8; 428/138; 428/213; 428/518
[58] Field of Search ................... 428/40.1, 40.5, 428/41.3, 41.5, 41.7, 41.8, 138, 213, 500, 518; 426/127; 206/461, 469, 479, 484, 484.2

[56] References Cited

U.S. PATENT DOCUMENTS

| | | | |
|---|---|---|---|
| Re. 30,009 | 5/1979 | Perdue et al. | 53/433 |
| 3,491,504 | 1/1970 | Young et al. | 53/22 |
| 3,574,642 | 4/1971 | Weinke | 99/174 |
| 3,681,092 | 8/1972 | Titchenal et al. | 99/174 |
| 3,713,849 | 1/1973 | Grindrod et al. | 99/174 |
| 4,055,672 | 10/1977 | Hirsch | 426/127 |
| 4,196,809 | 4/1980 | Tonrey | 206/484 |
| 4,285,430 | 8/1981 | Caunt | 206/471 |
| 4,287,151 | 9/1981 | Esakov et al. | 254/560 |
| 4,382,513 | 5/1983 | Schirmer et al. | 206/484 |
| 4,638,913 | 1/1987 | Howe, Jr. | 206/632 |
| 4,766,018 | 8/1988 | Hinrichsen et al. | 428/35 |
| 4,875,587 | 10/1989 | Lulham et al. | 206/484 |
| 4,886,690 | 12/1989 | Davis et al. | 428/367 |
| 4,889,731 | 12/1989 | Williams, Jr. | 426/106 |
| 4,952,628 | 8/1990 | Blatz | 525/58 |
| 4,956,212 | 9/1990 | Bekele | 428/366 |
| 4,977,004 | 12/1990 | Bettle, III et al. | 428/367 |
| 5,075,143 | 12/1991 | Bekele | 428/366 |
| 5,106,688 | 4/1992 | Bradfute et al. | 428/215 |
| 5,346,735 | 9/1994 | Logan et al. | 428/367 |

FOREIGN PATENT DOCUMENTS

| | | |
|---|---|---|
| 0245774 | 2/1961 | Australia . |
| 1258357 | 3/1961 | France . |
| 1286018 | 1/1962 | France . |
| 2249234 | 8/1972 | Germany . |

*Primary Examiner*—Nasser Ahmad
*Attorney, Agent, or Firm*—Thomas C. Lagaly

[57] ABSTRACT

A composite film and vacuum skin package for packaging a product such as a fresh red meat is disclosed. The composite film is thermoformed and sealed under vacuum to a support member to completely enclose a product which is positioned on the support member. The composite film is a permeable film weakly bonded to an impermeable film, permitting the impermeable film to be peeled from the package while leaving the permeable film intact so that the fresh red meat product can bloom from a purplish color to a desirable red color upon exposure to oxygen. The permeable and impermeable films are fully peelable without the need for a migratable wax to enhance peelability.

13 Claims, 2 Drawing Sheets

VACUUM SKIN PACKAGE AND COMPOSITE FILM THEREFOR

This application is a Continuation of application Ser. No. 08/369,846, filed Jan. 6, 1995, now abandoned, which is a Continuation-in-Part of Ser. No. 08/343,299, filed Nov. 22, 1994, now abandoned.

FIELD OF THE INVENTION

This invention generally relates to thermoformable barrier films and to vacuum skin packages which can be made therefrom. More particularly, the invention relates to vacuum skin packaging utilizing multilayer gas barrier films comprising a peelable nonpermeable (i.e., barrier) film adhered to a permeable film, and in which the amount of migratable waxes in either of the film layers at their interface is preferably less than about 0.45 weight percent.

BACKGROUND OF THE INVENTION

Skin packaging can be classified as a vacuum forming process for thermoformable polymeric films. The product on a supporting member serves as the mold for the thermoformable film which is formed about the product by means of differential air pressure. The term "vacuum skin packaging" (hereinafter "VSP") as used herein indicates that the product is packaged under vacuum and the space containing the product is evacuated from gases. It is therefore desirable that the film formed around the product and for the support member to each present a barrier to oxygen, air, and other gases detrimental to the shelf or storage life of a product such as a food product.

Skin packaging is described in many references, including French Patent No. 1,258,357, French Patent No. 1,286,018, Australian Patent No. 3,491,504, U.S. Pat. No. RE 30,009, U.S. Pat. No. 3,574,642, U.S. Pat. No. 3,681,092, U.S. Pat. No. 3,713,849, U.S. Pat. No. 4,055,672, and U.S. Pat. No. 5,346,735. U.S. Pat. No. 5,346,735 is incorporated herein by reference. Typically, skin packaging provides just a barrier film that upon removal from the package leaves the product exposed to atmosphere, which is sufficient for applications such as bulk meat cutting and repackaging. It is desirable in other applications to provide a composite packaging film comprising both a permeable (i.e., non-barrier) film and a peelable nonpermeable film so that upon removal of the peelable nonpermeable film the product is still selectively protected by the permeable film. This permits a product such as a fresh red meat to be protected by the permeable film but allow the meat to "bloom" from a purplish color to a customer-preferred reddish color upon exposure to oxygen. Commercially available thermoplastic composite films for vacuum skin packaging having both a peelable nonpermeable film and a permeable film include W. R. Grace & Co.'s LDX-2881, LDX-2986, LDX-3690, and LDX-4098.

It is important that the peelable nonpermeable film have certain properties or characteristics. One is that it should adhere to the permeable layer throughout the manufacturing, fabricating, and packaging processes up until the time it is desired to peel it away. It is then important that it readily separates from the permeable film without weakening or tearing the permeable film or otherwise compromising the package integrity. It is therefore important that the peelable nonpermeable and permeable films have sufficient adherence strength without requiring too high a peel strength for separation. Similarly, the permeable film should have sufficient strength so that it will not tear when subjected to the separation forces during peeling. U.S. Pat. No. 5,346,735 discloses examples of peel strength tests of some composite packaging films. The permeable film component of these composite films typically contains additives such as migratable waxes at the nonpermeable film/permeable film interface to facilitate peelability. Examples of such waxes include behenamide, stearamide, and erucamide, to name but a few. However, the use of these migratable additives in the permeable film has disadvantages.

One disadvantage is that the additive may not uniformly migrate to the interface surface. This can result in nonuniform peel strength and uneven peel forces along the interface, which can lead to tears or holes in the permeable film. This tendency is enhanced at locations where the film has been distended during thermoforming, such as at package/product/film boundaries. The resulting tears or holes allow leakage of product purge or juices from the package. The leaking package must then be repackaged by the merchant, causing inconvenience and increasing costs and overhead. Another disadvantage is that migratable additives add to the cost of the film layer materials.

It is therefore desirable to provide a peelable composite packaging film without these disadvantages.

SUMMARY OF THE INVENTION

The invention in one aspect is directed to a composite film suitable for vacuum skin packaging and comprising a permeable film and an impermeable film which is peelably removable from the permeable film. The permeable film comprises a semi-adherent layer that is peelably adhered to the impermeable film, wherein the semi-adherent layer comprises a polymer selected from the group consisting of polypropylene, ethylene propylene copolymer, and an ethylene/alpha-olefin copolymer having a density in the range of from greater than 0.94 g/cc to about 0.96 g/cc.

When the semi-adherent layer comprises ethylene propylene copolymer, the ethylene propylene copolymer is preferably blended with an adhesive. The adhesive may be selected from the group consisting of acid-modified ethylene/vinyl acetate copolymers, acid-modified ethylene/acrylate copolymers, anhydride-modified ethylene/acrylate copolymers, anhydride-modified ethylene/vinyl acetate copolymers, anhydride-modified polyethylenes, and anhydride-modified homopolymers and copolymers of polypropylene. More preferably, the adhesive is an anhydride-modified homopolymer or copolymer of polypropylene.

It is preferred that the adhesive be present at a weight percentage ranging from 0.1 to 25 and the ethylene propylene copolymer is present at a weight percentage ranging from 75 to 99.1, based on the total weight of the adhesive/EPC blend. More preferably, the adhesive is present at a weight percentage ranging from 8 to 13 and the ethylene propylene copolymer is present at a weight percentage ranging from 87 to 92.

The permeable film may further comprise:
(a) a sealant outer layer; and
(b) a core layer positioned between the sealant outer layer and the semi-adherent layer.

The impermeable film may comprise:
(a) a first ethylene vinyl alcohol layer immediately adjacent to the semi-adherent layer;
(b) a first tie layer adjacent to the first ethylene vinyl alcohol layer;
(c) a second ethylene vinyl alcohol layer adjacent to the first tie layer;

(d) a second tie layer adjacent to the second ethylene vinyl alcohol layer;

(e) an optional layer comprising a polymer selected from the group consisting of an ionomer, an ethylene vinyl acetate copolymer, and mixtures thereof; and (f) an outer abuse layer.

Another aspect of the invention is directed to a vacuum skin package, comprising:

a support member; and a composite film in adherence with the support member such that an enclosure suitable for containment of a product is formed. The composite film is as described above with the permeable film being positioned between the support member and the impermeable film. The permeable film may further comprise a sealant outer layer bonded to the support member and a core layer positioned between the sealant outer layer and the semi-adherent layer. Preferably, the bond between the sealant outer layer and the support member has a strength which is greater than the force required to peel the impermeable film from the permeable film. In this manner, the impermeable film can be peeled from the permeable film and the product will continue to be fully contained within the vacuum skin package.

The selection of materials for the semi-adherent layer in accordance with the present invention eliminates the need for a migratable wax in the semi-adherent layer as had previously been required in order to ensure separation of impermeable film from the permeable film. By eliminating the need for waxes, the peel force required to separate the permeable and impermeable films is more uniform. In addition, the semi-adherent layer itself provides an optimal level of adhesion between the permeable and impermeable films. As a result, the impermeable film can be smoothly peeled from the permeable film with a minimal likelihood that the permeable film will weakened or torn. The leakage rate of the vacuum skin packages is thus decreased, necessitating less repackaging by the user and reducing overhead costs. A further cost reduction in manufacturing is realized by elimination of the migratable wax additive.

DEFINITIONS

Figure 1:
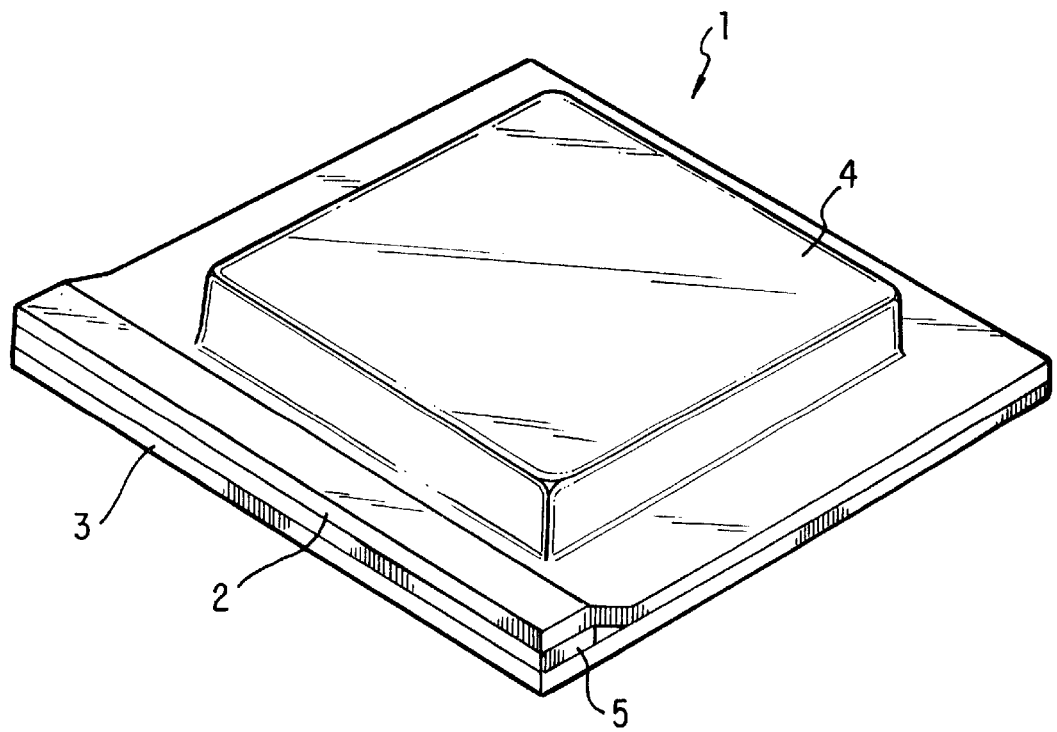
FIG. 1 is a perspective view of one embodiment of a vacuum skin package which can be made using the film and process of the invention.

Certain terms used in the specification are defined as follows.

PVDC designates polyvinylidene chloride copolymers. Typical PVDC copolymers include vinylidene chloride/ vinyl chloride copolymer, vinylidene chloride/methyl acrylate copolymer, and vinylidene chloride/acrylonitrile copolymer.

EVA designates ethylene/vinyl acetate copolymer.

EMA designates ethylene/methyl acrylate copolymer.

EBA designates ethylene/butyl acrylate copolymer.

EPC designates ethylene/propylene copolymer.

Ethylene/alpha-olefins: generally designates copolymers of ethylene with one or more comonomers selected from $C_3$ to $C_{10}$ alpha-olefins, such as 1-butene, 1-pentene, 1-hexene, 1-octene, and the like, in which the polymer molecules comprise long chains with few side chains or branches and sometimes are referred to as linear polymers. These polymers are obtained by low pressure polymerization processes and the side branching which is present will be short compared to non-linear polyethylenes. Ethylene/alpha-olefin copolymers generally have a density in the range of from about 0.86 g/cc to about 0.94 g/cc. The term linear low density polyethylene is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene alpha-olefins may be referred to as very low density polyethylene (VLDPE, typically used to refer to the ethylene butene copolymers available from Union Carbide) and ultra-low density polyethylene (ULDPE, typically used to refer to the ethylene octene copolymers supplied by Dow).

The phrase "ethylene/alpha-olefin copolymers" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of 1-butene, 1-hexene, and 1-octene.

EVOH: designates ethylene/vinyl alcohol copolymer or hydrolyzed ethylene/vinyl acetate copolymer and is sometimes abbreviated "HEVA". EVOH resins are noted for their very good gas barrier properties but can be moisture sensitive. These resins are available from suppliers such as Evalca in the United States, and Kuraray and Nippon Gohsei in Japan.

Ionomer: designates metal salts of acidic copolymers, such as metal salts of ethylene/acrylic acid copolymers or metal salts of ethylene/methacrylic acid copolymers. These are available from DuPont under the trade name Surlyn™.

Tie: designates an adhesive layer in a film.

DESCRIPTION OF THE PREFERRED EMBODIMENTS

FIG. 1 illustrates vacuum skin package 1 that comprises gas impermeable support member 3 on which is positioned product 4. Support member 3 preferably comprises a polyvinyl chloride (PVC) substrate coated with a gas barrier material and a heat sealing material. In another embodiment, support member 3 comprises a polymeric foam (e.g., polystyrene) coated with a gas barrier material and a heat sealing material. In yet another embodiment, support member 3 comprises cardboard coated with a gas barrier material and heat sealing material. In general, support member 3 can comprise any gas barrier support member capable of sealing to a film of the invention as described herein. Heat sealing materials useful with support member 3 include branched-chain low density polyethylene (LDPE), ionomers such as Surlyn™ available from DuPont, ethylene/methacrylic acid copolymers such as Nucrel™ available from DuPont, ethylene/acrylic acid copolymers such as Primacor™ available from Dow, and EVA copolymers, to name but a few. Support member 3 may be flat as shown or it may be formed in the shape of a tray.

Product 4 is typically a food product such as fresh red meat. Retail cuts of beef, pork, veal and lamb are preferred food products for use with the package of the invention. When such food products are vacuum skin packaged or packed in the absence of oxygen, the fresh red meat will tend to turn a purplish color and remain that way as long as it is chilled and kept out of contact with oxygen. The bright red bloom is restored when the meat makes contact with oxygen again.

Figure 4:
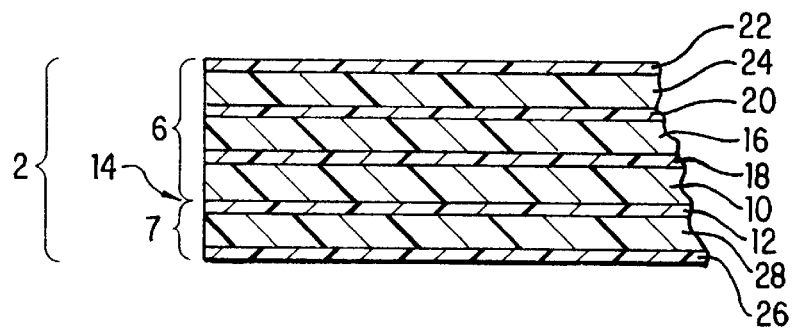
FIG. 4 is a schematic cross section view of the composite film according to the invention.

Thermoformable composite film 2 covers product 4 and is sealed around the perimeter of product 4, thereby assuming the shape of the product and thus becoming a "skin", and is shown in greater detail in FIG. 4. Composite film 2 comprises impermeable film 6 peelably adhered to permeable film 7. Film 2 is preferably coextruded and as shown comprises nine coextruded layers. Layer 10 of impermeable film 6 and semi-adherent layer 12 of permeable film 7 define interface 14 therebetween, and the selection of the appropriate materials for layers 10 and 12 is such that during fabrication of composite film 2, as by coextrusion, a relatively weak bond of adhesion is formed at interface 14 without necessitating the inclusion of migratable waxes in layers 10 or 12. The weak bond has sufficient strength to adhere film 6 to film 7 until the user proceeds to separate film 6 from film 7 as is further described below.

The inventors have determined that an acceptable peel force between permeable film 7 and impermeable film 6 ranges from about 0.02–0.05 lbs. A more preferred peel force between the two films ranges from about 0.025–0.04 lbs. A peel force falling within these ranges, particularly within the preferred range, has been found to provide an optimum balance between: 1) sufficient adhesion to prevent premature film separation, e.g., during shipping and storage, and 2) sufficient peelability that the two films can be separated without tearing or otherwise compromising permeable film 7. A peel force of more than about 0.05 lbs results in an unacceptably high incidence of damage to permeable film 7 when impermeable film 6 is peeled therefrom. On the other hand, a peel force of less than about 0.02 lbs indicates that an insufficient amount of adhesion exists between films 6 and 7 so that the likelihood of premature separation (and, therefore, spoilage of product 4) is unacceptably high.

The selection of the appropriate material for each layer 10 and 12 is interdependent and dependent on their relative bonding characteristics and compatibility. It will be understood that in the following discussion of appropriate materials for layers 10 and 12, neither layer will normally include more than a trace amount of a migratable wax, if any. "Trace amount" means an amount of migratable wax less than about 0.45 percent by weight based on the total weight of layer 12. Preferably, migratable wax is present in an amount of less than about 0.25 percent and, more preferably, is absent from either layer.

In one embodiment, layer 10 is EVOH and layer 12 comprises an ethylene/alpha-olefin copolymer having a density in the range of greater than about 0.94 g/cc to about 0.96 g/cc. At an ethylene/alpha-olefin density below about 0.94 g/cc, the adhesion between layer 12 and layer 10 has been found to be too high for smooth separation of the two layers without an unacceptably high incidence of damage to permeable film 7. At densities above 0.94 g/cc, however, it has been determined that the two layers can be separated without damage to film 7 and, therefore, without the need for migratable wax in layer 12 as had previously been the case. Thus, an example of a suitable material for layer 12 is HDPE.

In another embodiment, layer 10 is EVOH and layer 12 is EPC. A preferred such EPC comprises about 2 to about 6 percent by weight ethylene copolymer and about 94 to about 98 percent by weight propylene copolymer. More preferably, the EPC contains from 2 to 4% by weight ethylene copolymer. EPC is the preferred material for layer 12 because it has been found to provide a combination of beneficial physical properties, including mechanical strength (toughness), optical clarity, and an adequately high oxygen transmission rate of around 6200 $cc/m^2$-day-atmosphere per mil of thickness. In addition, the adhesion between EPC and EVOH (the preferred material for layer 10) is relatively low (see Table 2 in Example 5 below). Thus, no slip agents, such as a migratable wax additive, is needed to provide good peelability between layers 10 and 12. Accordingly, EPC is ideally suited for use as the semi-adherent layer 12 of the present invention.

In a particularly preferred embodiment, layer 12 comprises a blend of EPC and an adhesive. The adhesive may be selected from materials which are typically used to form "tie" layers in multilayer films. Examples of such materials include, without limitation, acid-modified ethylene/vinyl acetate copolymers, acid-modified ethylene/acrylate copolymers, anhydride-modified ethylene/acrylate copolymers, anhydride-modified ethylene/vinyl acetate copolymers, anhydride-modified polyethylenes, and anhydride-modified homopolymers and copolymers of polypropylene. These materials are available commercially and are produced by, e.g., DuPont under the Bynel brand name, Mitsui under the Admer brand name, Quantum under the Plexar brand name, Elf Atochem under the Orevac brand name, and Morton International under the Tymor brand name. It is believed that the functional groups (i.e., acid or anhydride groups) are added to the base polymers via polymer grafting. A preferred adhesive is an anhydride-modified polypropylene available from DuPont under the trade name Bynel E302.

The EPC/adhesive blend may comprise from 0 to 25% by weight adhesive, but more preferably comprises from 8 to 13% by weight adhesive. When added to EPC at the foregoing weight percentages, the adhesive has been found to provide optimal adhesion of permeable film 7 to impermeable film 6, i.e., the adhesion between the permeable and impermeable films is advantageously increased without detrimental effect on the excellent peelability properties of the EPC. In this manner, permeable film 7 is unlikely to be weakened, torn, or otherwise compromised when impermeable film 6 is separated therefrom. On the other hand, the addition of adhesive to the EPC ensures that impermeable film 6 will not separate prematurely or inadvertently from permeable film 7, e.g., during shipment or storage, thereby resulting in the possible spoilage of the packaged product before it can be displayed for customer purchase.

Another suitable material for layer 12 is polypropylene. If desired, an adhesive may also be blended with this material.

FIG. 4 illustrates a preferred film construction. In order to obtain good gas barrier properties at both low and high relative humidities, impermeable film 6 has two EVOH layers, inclusive of layer 10. Preferably, impermeable film 6 has an oxygen transmission rate (OTR) of less than 40 cc/m$^2$-day-atmosphere. The second EVOH layer 16 is interposed between two tie layers 18 and 20. Preferred EVOH resins for layers 10 and 16 contain between 27 and 48 mole percent of ethylene, and a particularly preferred commercial resin is EVAL E151A available from Evalca. Layers 10 and 16 can also include amorphous nylon, examples of such materials being described in U.S. Pat. No. 5,346,735. Layers 18 and 20 are preferably an anhydride modified EVA such as Bynel CXA 3062, or a blend of modified EVA and another EVA such as Elvax 3165 available from DuPont. Other suitable materials for layers 18 and 20 are described in U.S. Pat. No. 5,346,735.

As is also illustrated in FIG. 4, impermeable film 6 can further comprise abuse layer 22 adhered to layer 20 either directly or by layer 24. Layer 24 typically is a tie layer such as an EVA layer or an ionomer. Layer 22 can comprise an HDPE or similar material which provides high gloss and good moisture barrier properties.

Film 6 preferably has a thickness in the range of from about 2.0 to about 6.0 mils. Preferred layer thicknesses are:

| LAYER | THICKNESS (MILS) |
| --- | --- |
| 22 | 0.4 |
| 24 | 0.4 |
| 20 | 1.1 |
| 16 | 0.3 |
| 18 | 1.2 |
| 10 | 0.3 |

Permeable film 7 should exhibit good oxygen permeability for satisfactory bloom of product 4 upon removal of impermeable film 6. A preferred oxygen transmission rate (OTR) for permeable film 7 is at least 7500 cc/m$^2$-day-atmosphere (dry basis). Such an OTR has been found to impart a desirably rapid bloom and an aesthetically pleasing color of red to product 4. As shown in Example 5, when a blend of EPC and adhesive was used to form a semi-adherent layer 12 of a permeable film 7, the permeable film was found to have an OTR of approximately 8500 cc/m$^2$-day-atmosphere. Thus, EPC is an excellent material for use in the semi-adherent layer 12 of the present invention. It should be understood, however, that permeable films having a lower OTR are still within the scope of the present invention. That is, while such lower OTR films may not provide as rapid a bloom or result in as desired a color as films with an OTR of at least 7500 cc/m$^2$-day-atmosphere, such films are nevertheless operable and, in some instances, may be desirable.

Film 7 comprises layer 12 as described above, and also preferably comprises sealant layer 26 and core layer 28 which is disposed between layers 12 and 26. Sealant layer 26 preferably comprises a polyethylene with a narrow molecular weight distribution, for example an Affinity resin such as Affinity FW 1650 available from Dow Chemical Co. Other suitable sealant layer 26 materials include ethylene vinyl acetate and ethylene methyl acrylate to name but a few, examples of which are described in U.S. Pat. No. 5,346,735. The selection of an appropriate sealing layer material may depend on the particular application and factors such as the product to be packaged, equipment and sealing temperatures and conditions, and compatibility with the other materials comprising package 1, all of which are readily determinable by one skilled in the art.

A suitable material for core layer 28 is one that exhibits good gas permeability. These include ethylene copolymers such as ethylene/alpha-olefin copolymers, EVA, EBA, ULDPE, and blends thereof, each of which shows a high OTR that enables a rapid bloom and good color retention of meats aged in the VSP barrier package. Other suitable materials include blends of EVA/ionomer and EBA/ionomer, such as are described in U.S. Pat. No. 4,956,212; ethylene-methyl pentene copolymers; styrene-butadiene copolymers; and styrene-isoprene copolymers. Although the presence of the ionomer imparts desirable mechanical properties to film 7, for example strength and toughness, it tends to decrease the gas permeability. The addition of plasticizer to the ionomer can increase the OTR of core layer 28. However, it is well known that plasticizers can migrate which can cause problems in some applications, and the amount of plasticizer suitable for a particular application can be readily determined by one skilled in the art. EBA is particularly preferred for core layer 28, as it exhibits a higher gas permeability than a comparable EVA material with the same ethylene content. Blends of different EBA's, that is EBA's having different ethylene:butyl acrylate weight ratios, are also preferred materials for core layer 28, such as the EBA materials described in U.S. Pat. No. 5,346,735.

Film 7 preferably has a thickness in the range of from about 1.0 to about 4.0 mils. Preferred layer thickness' are:

| LAYER | THICKNESS (MILS) |
| --- | --- |
| 12 | 0.2 |
| 28 | 2.5 |
| 26 | 0.4 |

Film 2 can be made by a coextrusion process as described in U.S. Pat. No. 4,287,151. Suitable annular or flat sheet multilayer coextrusion dies for coextruding the films of the invention are well known in the art.

Composite film 2 is preferably crosslinked. The preferred method of crosslinking is by electron-beam irradiation and is well known in the art. One skilled in the art can readily determine the radiation exposure level suitable for a particular application.

Figure 2:
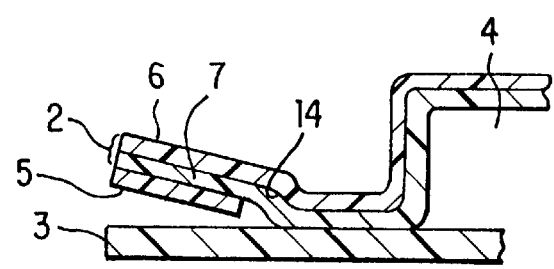
FIG. 2 illustrates the composite film according to the invention and further illustrates an optional tab arrangement for peeling away the peelable film as one aspect of the invention.
Figure 3:
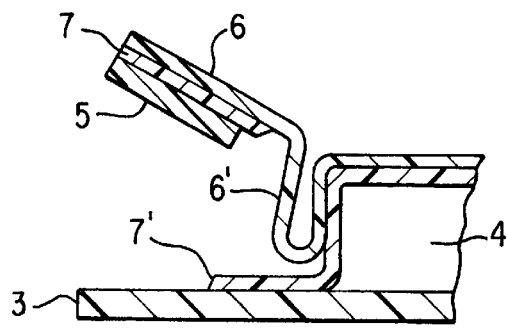
FIG. 3 illustrates a peeling operation performed on the film of FIG. 2.

Turning now to FIGS. 1–3, tab 5 is provided across one edge of package 1 as illustrated in FIG. 1 so that in the forming of film 2 around product 4 it does not adhere to support member 3. Tab 5 as shown in FIG. 2 can thus be gripped and pulled to a position as shown in FIG. 3 so that film 7 delaminates at interfacing rather than at its bond with support member 3. This leaves permeable film 7' firmly adhered to support member 3 and enclosing product 4 because the material of sealing layer 26 is selected so as to form a bond to support member 3 that is stronger than its internal cohesive strength. In either this embodiment, or in an alternative embodiment without tab 5 in which the following references to film 7' can be construed as representing film 7, film 7' separates from film 6 at interface 14 while maintaining its seal to support member 3, the bond strength between film 7' and support member 3 being greater than the weak bond at interface 14 between film 6 and film 7'. In this manner film 6 can be completely separated from package 1 while leaving film 7' intact and sealed thereto to encase product 4 and allow product 4, for example a fresh red meat, to regain its bright red bloom and be suitable for display in a showcase or retail display.

In the method of the invention utilizing the components described above, after positioning product 4 on support member 3, composite film 2 is positioned over product 4 and support member 3 thermoformed to support member 3 while a partial vacuum is drawn between film 2 and support member 3. In this manner, film 2 is closely formed to both product 4 and to support member 3. Film 2 is sealed to support member 3 to form a complete enclosure around product 4. Package 1 can be stored or preserved in this configuration until it is desired to display package 1 for retail sale, at which time film 6 can be peeled from package 1.

The invention is further illustrated by the following examples of its practice. Percentages in the examples are percentages by weight unless indicated otherwise.

Preparation of Films

Comparison Film 1

A film as described in U.S. Pat. No. 5,346,735, Example II, Film (I), was coextruded and irradiated with an electron beam. Comparison Film 1 had a multilayer-layer structure with the layers positioned in the relative order shown below. The permeable film layers are labeled with primes and the interface between the permeable and impermeable films is shown by the double line:

| Layers | 1'/ 2'/ 3'// 1 / 2 / 3 / 4 / 5 / 6 |
|---|---|
| Thickness (Mils) | 0.4/2.0/0.2//0.3/1.1/0.30/1.2/0.40/0.4 | where:
Layer 1' = EVA (18 to 25% VA) + LDPE based antiblock
Layer 2' = EBA
Layer 3' = LMDPE (density 0.935 g/cc) with wax additive in the amount of 0.45 percent by weight
Layer 1 = EVOH (44 mol % ethylene)
Layer 2 = Blend of 35% ionomer and 35% EVA (18% VA) + 30% EVA-based tie
Layer 3 = EVOH as in layer 1
Layer 4 = Same as layer 2
Layer 5 = Ionomer
Layer 6 = HDPE Comparison Film 2

A second film (2) was prepared as in Example 1 except that the thickness of Layer 2' was increased to 2.5 mils.

Film 3

A third film (3) was prepared as in Example 1 but having the structure:

| Layers | 1'/ 2'/ 3'// 1 / 2 / 3 / 4 / 5 / 6 |
|---|---|
| Thickness (Mils) | 0.4/2.0/0.2//0.3/1.1/0.3/1.2/0.4/0.4 | where:
Layer 1' = Narrow molecular weight distribution polyethylene
Layer 2' = EBA Blend of EBA (18% BA) and EBA (30% BA)
Layer 3' = EPC without a wax additive
Layer 1 = EVOH (44 mol % ethylene)
Layer 2 = Blend of 70% EVA (18% VA) + 30% EVA-based tie
Layer 3 = EVOH as in layer 1
Layer 4 = Same as layer 2
Layer 5 = Ionomer
Layer 6 = HDPE

EXAMPLES 1–4

Figure 5:
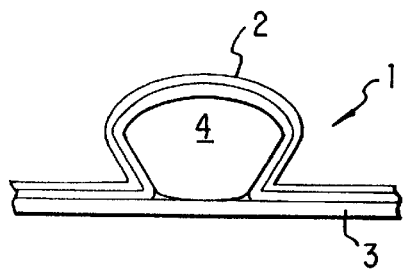
FIG. 5 illustrates a vacuum skin package in which a peelable VSP film encloses a high profile product having inward-sloped sides such as a round roast.
Figure 6:
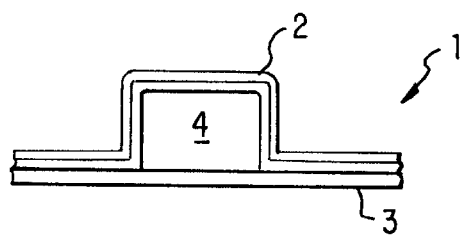
FIG. 6 illustrates a vacuum skin package in which a peelable VSP film encloses a product with unsloped sides.

For each example, a quantity of 100 packages as illustrated in FIGS. 1–4 and described above, each containing a meat product, were made using one of films 1–3 as specified in the Table below. In Examples 3 and 4, a Multivac® CD-6000 vacuum skin packaging apparatus was used to package a high profile meat product having inward-sloped sides, and the resulting package had the appearance as shown in FIG. 5. In Examples 1 and 2, a Cryovac® VS-44 machine was used to package a meat product with unsloped sides as illustrated in FIG. 6. After each run of 100 packages, the peelable barrier film was removed from each package which was then visually inspected for leakage. The results are shown in Table 1 below.

TABLE 1

| Example | Film | Percent Packages that Leaked |
|---|---|---|
| 1 | 1 | 20 |
| 2 | 2 | 7 |
| 3 | 2 | 29 |
| 4 | 3 | 19 |

The results indicate that the films and packages of the invention (Example 4) demonstrate excellent nonleakage rates compared to Examples 1–3. It is also evident from Examples 2 and 3 that the same film (2) when subjected to the more rigorous packaging application of Example 3 (product with sloped sides) demonstrates an approximate four-fold increase in leakage rate. This is attributable to the increased distention of the film where it forms around the product at the tray surface. Conversely, Example 4 demonstrates good results in the more rigorous application (FIG. 5) which projects a significant improvement in the less rigorous application (FIG. 6) compared to both Examples 1 and 2 which tested films requiring more than 0.45 percent by weight of a migratable wax in one or both of layers 10 and 12.

The packages were also visually inspected for bloom after removal of the barrier film, and the packaged meat product of Example 4 exhibited bloom on a par with that of Example 3. It was also observed that the barrier film of Example 4 demonstrated better peelability from the package compared to the barrier films of Examples 1–3.

EXAMPLE 5

In accordance with ASTM F904, peel force measurements were conducted on composite film samples 4–10, the results of which are set forth in Table 2 below, to determine the amount of force required to separate the permeable film from the impermeable film for each composite film sample. Film 4 is a comparison film while Films 5–10 are in accordance with the present invention. Each of the films was identical to Film 3 in construction and preparation, except that Layer 2' was 2.5 mil and the composition of Layer 3' (i.e., the semi-adherent layer) was varied from film to film so that peel force measurements resulting from those compositions could be compared. Each of the results in Table 2 is the mean value of four (4) peel force measurements for each film sample.

The following abbreviations apply to Table 2:
LMDPE=Dowlex 2037 from Dow Chemical Co. (density 0.935 g/cc);
WAX=a migratable wax additive as in Film 1;
MCPE=Affinity HF 1030 from Dow Chemical Co. (a metallocene-catalyzed homogeneous ethylene/alpha-olefin copolymer having a density of 0.935 g/cc);
$EPC_1$=PD 9302 from Exxon (3.3% ethylene copolymer and 96.7% propylene copolymer);
$EPC_2$=WRS 6-217 from Shell (5.5% ethylene copolymer and 94.5% propylene copolymer); and
ADHESIVE=Bynel E-302, an anhydride-modified polypropylene adhesive from DuPont.

TABLE 2

| Film | Semi-Adherent Layer | Peel Force (lbs) |
|---|---|---|
| 4 | LMDPE + 0.5% WAX | 0.0420 |
| 5 | LMDPE | 0.0551 |
| 6 | MCPE | 0.0528 |
| 7 | $EPC_1$ | 0.0193 |
| 8 | $EPC_2$ | 0.0191 |
| 9 | 90% $EPC_1$ + 10% ADHESIVE | 0.0328 |
| 10 | 85% $EPC_1$ + 15% ADHESIVE | 0.0501 |

As stated previously, while films having a peel force ranging from 0.02–0.05 lbs are acceptable, films having a peel force ranging from 0.025–0.04 lbs have been found to provide superior performance. That is, films having a peel force ranging from 0.025–0.04 lbs have been found to achieve an optimum balance between having sufficient adhesion between the permeable and impermeable films so that premature film separation is unlikely to occur during shipping and storage, and being sufficiently peelable so that the two films can be separated without tearing or otherwise compromising the permeable film. In this regard, Film 9 exhibited the best results in that the peel force thereof falls within the optimum range. In addition, the permeable portion of Film 9 was found to exhibit an excellent Oxygen Transmission Rate of approximately 8500 $cc/m^2$-day-atmosphere. As mentioned previously, EPC provides good mechanical strength (i.e., toughness) and semi-adherent clarity. When blended with an adhesive in accordance with the teachings of present invention, these properties were found to be unaffected, i.e., the adhesive is fully compatible with the EPC. For these reasons, a blend of EPC and adhesive is the preferred material for semi-adherent layer 12.

The invention has been described in detail with particular reference to specific embodiments, but it will be understood that variations and modifications can be effected within the spirit and scope of the invention.

What is claimed is:

1. A vacuum skin packaging composite film comprising a permeable film and an impermeable film which is peelably removable from said permeable film, said permeable film comprising a single semi-adherent layer that is peelably adhered to said impermeable film at a peel force ranging from about 0.02 to 0.05 pounds/inch, a sealant outer layer and a core layer positioned between said sealant outer layer and said semi-adherent layer, wherein the core and the sealant layers are different from the semi-adherent layer, wherein said semi-adherent layer comprises an adhesive blended with a polymer selected from the group consisting of polypropylene and ethylene propylene copolymer and further said semi-adherent layer contains less than 0.45 weight percent migratable waxes.

2. The composite film of claim 1, wherein said polymer comprises ethylene propylene copolymer.

3. The composite film of claim 2, wherein said ethylene propylene copolymer comprises ethylene in an amount of from about 2 to about 6 percent by weight and propylene in an amount of from about 94 to about 98 percent by weight.

4. The composite film of claim 1, wherein said adhesive is selected from the group consisting of acid-modified ethylene/vinyl acetate copolymers, acid-modified ethylene/acrylate copolymers, anhydride-modified ethylene/acrylate copolymers, anhydride-modified ethylene/vinyl acetate copolymers, anhydride-modified polyethylenes, and anhydride-modified homopolymers and copolymers of polypropylene.

5. The composite film of claim 4, wherein said adhesive is an anhydride-modified homopolymer or copolymer of polypropylene.

6. The composite film of claim 2, wherein said adhesive is present at a weight percentage ranging from 0.1 to 25 and said ethylene propylene copolymer is present at a weight percentage ranging from 75 to 99.9.

7. The composite film of claim 6, wherein said adhesive is present at a weight percentage ranging from 8 to 13 and said ethylene propylene copolymer is present at a weight percentage ranging from 87 to 92.

8. The composite film of claim 1, wherein said impermeable film is peelably removable from said permeable film at a peel force ranging from 0.025 to 0.04 pounds/inch.

9. The composite film of claim 1 wherein said permeable film has a dry oxygen transmission rate of at least 7500 $cc/m^2$-day-atmosphere.

10. The composite film of claim 1 wherein said core layer comprises a material selected from the group consisting of ethylene/butyl acrylate copolymers, ethylene/alpha-olefin copolymers, ethylene/vinyl acetate copolymers, ultra-low density polyethylenes, ethylene/methyl pentene copolymers, styrene/butadiene copolymers, styrene/isoprene copolymers, blends of the foregoing, and blends of ionomer with any of the foregoing.

11. The composite film of claim 1, wherein said impermeable film comprises:

(a) a first ethylene vinyl alcohol layer immediately adjacent to said semi-adherent layer of said impermeable film;

(b) a first tie layer adjacent to said first ethylene vinyl alcohol layer;

(c) a second ethylene vinyl alcohol layer adjacent to said first tie layer;

(d) a second tie layer adjacent to said second ethylene vinyl alcohol layer;

(e) an optional layer comprising a polymer selected from the group consisting of an ionomer, an ethylene vinyl acetate copolymer, and mixtures thereof; and (f) an outer abuse layer.

12. The composite film of claim 1, wherein said composite film has a total thickness in the range of from about 3.0 to about 10.0 mils.

13. A vacuum skin package comprising a support member and a composite film in accordance with claim 1, wherein said composite film is in adherence with said support member such that an enclosure suitable for containment of a product is formed.

* * * * *